3,117,019
FOILS AND PROCESS FOR COATING FOILS CONSISTING OF LINEAR POLYCARBONATES OF HIGH MOLECULAR WEIGHT WITH CELLULOSE ESTERS
Walther Cohnen, Cologne-Mulheim, and Helfried Klockgether, Leverkusen, Germany, assignors to Agfa Aktiengesellschaft, Leverkusen, Germany, a corporation of Germany
Filed Sept. 27, 1960, Ser. No. 58,615
Claims priority, application Germany Oct. 1, 1959
11 Claims. (Cl. 117—73)

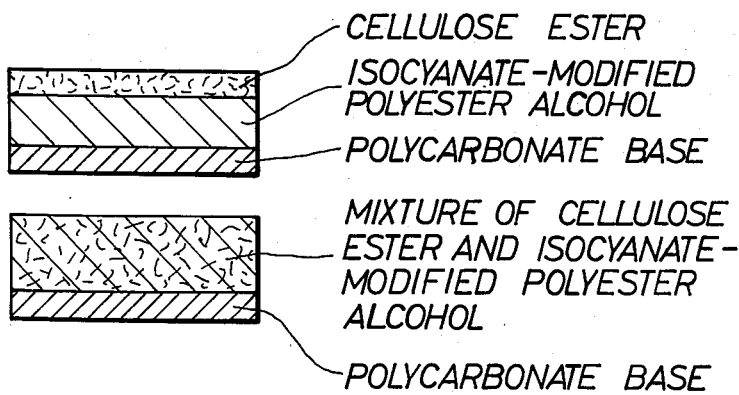

The present invention relates to foils and a process for coating foils of linear polycarbonates of high molecular weight with organic or inorganic cellulose esters of high molecular weight.

Linear polycarbonates of high molecular weight, the production of which is described inter alia in German Patents No. 971,790 and 971,777, have acquired great importance recently because of their excellent physical properties, especially in connection with their use as foils. For example, their use as a film support for photographic silver halide emulsions is described in German Patent No. 1,001,586 for magnetic record supports in German Patent No. 1,035,375 and for electrical insulation foils in German Patent No. 962,274. According to the foregoing patents, such polycarbonates can be prepared by reacting an aromatic bisphenol with phosgene or a monoester of chloroformic acid (which is also known as chlorocarbonic acid) or a diester of carbonic acid. Bisphenols which are especially suitable for the preparation of polycarbonates are bis(hydroxyphenyl)alkanes, such as 4,4'-dihydroxydiphenylmethane,
2,2-bis(4-hydroxyphenyl)propane (known also as bisphenol A),
1,1-bis(4-hydroxyphenyl)cyclohexane,
1,1-bis(3-methyl-4-hydroxyphenyl)cyclohexane,
2,2-bis(4-tert-butyl-2-hydroxyphenyl)propane,
3,4-bis(4-hydroxyphenyl)hexane,
1-phenyl-1,1-bis(4-hydroxyphenyl)ethane,
2,2-bis(4-hydroxyphenyl)butane (also known as bisphenol B),
2,2-bis(4-hydroxyphenyl)pentane,
3,3-bis(4-hydroxyphenyl)pentane,
3-methyl-2,2-bis(4-hydroxyphenyl)butane,
2,2-bis(4-hydroxyphenyl)hexane,
4-methyl-2,2-bis(4-hydroxyphenyl)pentane,
2,2-bis(4-hydroxyphenyl)heptane,
4,4-bis(4-hydroxyphenyl)heptane,
2,2-bis(4-hydroxyphenyl)tridecane, bisphenolic ethers such as bis(4-hydroxyphenyl) oxide, bisphenolic thioethers such as bis(4-hydroxyphenyl) sulphide, and bisphenolic sulfones such as bis(4-hydroxyphenyl) sulfone. These bisphenols can be partially replaced by aliphatic, cycloaliphatic or other aromatic dihydroxy compounds such as ethylene glycol, diethylene glycol, triethylene glycol and other polyethylene glycols, thiodiglycol,
ethylene dithiodiglycol,
1,2-propanediol,
polyglycols produced from 1,2-propylene oxide,
1,3-propanediol,
1,3-butanediol,
1,4-butanediol,
2-methyl-1,3-propanediol,
1,5-pentanediol,
2-ethyl-1,3-propanediol,
1,6-hexanediol,
1,8-octanediol,
2-ethyl-1,3-hexanediol,
1,10-decanediol,
cyclohexanediols (quinitol),
1,2-cyclohexanediol,
2, 3, and 4-xylylene glycols,
2,2-bis(4-hydroxycyclohexyl)propane,
2,6-dihydroxydecahydronaphthalene,
hydroquinone,
resorcinol,
pyrocatechol,
4,4'-dihydroxydiphenyl,
2,2'-dihydroxydiphenyl,
1,4-dihydroxynaphthalene,
1,6-dihydroxynaphthalene,
2,6-dihydroxynaphthalene,
1,2-dihydroxynaphthalene,
1,5-dihydroxyanthracene,
1,4-dihydroxyquinoline,
2,2'-dihydroxy-1,1'-dinaphthyl, and
2, 3, and 4-hydroxybenzyl alcohols.

Their outstanding physical properties, such as mechanical strength, transparency, insensitivity to water and the like, would permit an even more extensive use of the polycarbonate foils if a process were known for coating them with other plastics, thereby providing the possibility of a combination with other plastic foils. Such processes are for example described in respect of foils consisting of polyalkylene terephthalate, (which foils are similarly outstanding because of mechanical strength), in German Patent No. 1,053,362, Belgian Patent No. 567,871 and British Patent No. 810,721.

Such a coating cannot be easily achieved with polycarbonate foils by casting a cellulose ester solution onto a polycarbonate foil. On account of the complete incompatibility of the two plastics, the cellulose ester foil is easily stripped off the polycarbonate foil again after drying. This effect is independent of the solvent which is used.

It has now been found that the coating of a foil of linear polycarbonates of high molecular weight with organic or inorganic cellulose esters, likewise of high molecular weight, can easily be effected by using as anchoring agent isocyanate-modified linear or branched polyhydroxy compounds which are of high molecular weight and which are soluble in organic solvents. Such isocyanate-modified polyhydroxy compounds of high molecular weight are described in German Patents No. 897,625 and 1,012,456.

The foils of the present invention, which consist of polycarbonates coated with a cellulose ester, are represented in the accompanying drawing. The top figure of the drawing depicts a cellulose ester layer bonded or anchored to a polycarbonate base through an intermediate layer of an isocyanate-modified polyester alcohol while the lower figure depicts a layer of a mixture of a cellulose ester and an isocyanate-modified polyester alcohol bonded directly to a polycarbonate base. The polyester alcohol is, as described herein, a polyester which contains uncombined or free hydroxyl radicals.

German Patent No. 897,625 concerns diisocyanate-modified soluble linear polyesters which are produced solely by the use of bifunctional starting compounds. These products can be prepared by condensing such products as for example hydroxy hydroxycarboxylic acids, equimolecular admixtures of glycols and dicarboxylic acids, ω-amino alcohols and dicarboxylic acids to polyesters of moderately high molecular weight. To these condensation products a suitable amount of a diisocyanate such as octamethylene diisocyanate, hexamethylene diisocyanate, diphenyl-4,4-diisocyanate is added. That mixture is heated until the degree of polymerization desired is reached.

Soluble branched isocyanate-modified polyhydroxy compounds are described in German Patent No. 1,012,456 and British Patent No. 787,592. These products are prepared by reacting a polyhydroxy compound, for example a polyester, polyalkylene glycol or combinations thereof, if desired in admixture with a small amount of a polyfunctional component, for example a polyalcohol with a polyisocyanate, respectively diisocyanates in such proportions that the reaction product contains free hydroxyl groups.

The soluble branched isocyanate-modified polyhydroxy compounds used in the process of the invention can be prepared for example by condensing in known manner diols and dicarboxylic acids or hydroxycarboxylic acids in the presence of small amounts of a higher than bifunctional alcohol component or acid component, weakly branched polyesters of moderately high molecular weight being produced. These polyesters are then reacted with diisocyanates to form the final products in accordance with the invention. Moreover, strictly linear, and therefore bifunctional polyesters of moderately high molecular weight can be mixed with a small amount of a polyfunctional component such as, for example a polyalcohol and the resulting mixture reacted with a diisocyanate to give the required final product. The polyfunctional component used in this reaction can also contain hetero atoms or aromatic, hydroaromatic or heterocyclic ring systems.

In addition, similar products are obtained if linear polyesters are reacted with diisocyanates and a small amount of a triisocyanate or a higher than trifunctional isocyanate.

An additional class of substances is the polyglycol ethers which can be produced by the polymerization of alkylene oxides; this class of substances, when used together with a small amount of a higher than bifunctional polyhydroxy component, can be reacted with a diisocyanate, or when used alone can be reacted with a diisocyanate and a small amount of a higher than bifunctional isocyanate, to form isocyanate-modified polyhydroxy compounds having the properties indicated above.

Combinations of polyglycol ethers and polyesters can also be used, so that the number of starting materials suitable for use in the process of the present invention is very large.

In each case, by using an appropriate amount of the polyfunctional component the required degree of branching is obtained, and by measuring the specific viscosity of the branched isocyanate-modified polyhydroxy compound in 0.1 percent m-cresol solution at 25° C.

Furthermore, the branched isocyanate-modified polyhydroxy compounds can be reacted with an additional amount of a polyisocyanate, such as for example tolylene diisocyanate, p-phenylene diisocyanate, 4,4'-diphenylmethane diisocyanate, tetra-methylene diisocyanate, hexamethylene diisocyanate, ω,ω¹-dipropylether diisocyanate, cyclohexane - 1,4-diisocyanate, dicyclohexylmethane-4,4'-diisocyanate, diphenyl-dimethylmethane-4,4'-diisocyanate, 1-methyl-benzene-2,4,6-triisocyanate, 1-methyl-3,5-diethyl - benzene - 2,4,6 - triisocyanate or polyisocyanates prepared from polyhydric alcohols and diisocyanates. Alternatively it is possible to use a compound which reacts as a polyisocyanate when heated; for example compounds known in the literature to split off isocyanate when heated, such as dimeric arylene diisocyanates or polymerization products of polyisocyanates can be used.

The film-forming polyhydroxy compounds can either be applied as an intermediate layer to the polycarbonate foil prior to the coating with cellulose ester, or can even be added to the cellulose ester solution, provided they are compatible with the latter.

The quantities of polyhydroxy compounds which are added to the cellulose ester solution can be varied within wide limits. The most favorable results were obtained with quantities between 10 and 120 parts by weight of polyhydroxy compound to 100 parts of cellulose ester. A sufficient adhesion of the cellulose ester layer to the polycarbonate foil was not obtained with quantities below 10 parts. With quantities higher than 120 parts, the character of the cellulose ester layer is greatly modified. Such layers show a tendency to tackiness and this is undesirable for most purposes.

When using the isocyanate-modified polyhydroxy compounds of high molecular weight as an intermediate layer, an improvement in the bonding strength of the cellulose ester layer on the polycarbonate foil can also be produced by introducing certain additives into the casting solution for the intermediate layer.

Additives which have proved especially suitable are polyisocyanates, for example hexamethylene diisocyanate, 1-methyl-benzene-2,6-diisocyanate, 1-methyl-benzene-2,4-diisocyanate, naphthalene-1,5-diisocyanate, triphenylmethane-4,4',4'' - triisocyanate, diphenylmethane-4,4'-diisocyanate; also reaction products of polyhydric alcohols (such as hexanetriol, glycerine or trimethylol propane), with an excess of a diisocyanate, trimers of diisocyanates, phosphorus-containing polyisocyanates, for example those described in French Patent No. 1,225,715.

The quantity of added polyisocyanate can be varied within wide limits and depends substantially on the chemical constitution of the compound concerned. The best results were generally produced with quantities of 5-25 parts by weight of polyisocyanate to 100 parts by weight of the isocyanate-modified polyhydroxy compound.

If desired, the applied cellulose ester layer can of course be dyed by adding dyestuffs or can be matted by adding matting agents. Plasticizers can also be added to the layers.

The cellulose ester layer is applied by one of the known processes, by casting on a drum or band casting machine, or by application in a dipping or soaking process.

The polycarbonate foils produced in this way and coated with cellulose esters are transparent and still have a very good mechanical strength, low water absorption, low steam permeability and low gas permeability, but have in addition the advantage that they can be united with all foils and plastics with which also cellulose ester foils can be united. The multilayer foil according to the invention can consequently be used for example in order to bond a polycarbonate foil to a cellulose ester foil, these foils being stuck or heat-sealed at their ends to the corresponding sides of the multilayer foil. By previous tapering of the zones to be united, the transitions at the adhesive positions can be so formed that the surfaces of the foils lie in one plane. This method of cementing or sticking is of particular interest in connection with cinematographic and miniature films, as well as for magnetic sound tapes.

The invention is further illustrated by the following examples:

*Example 1*

A foil with a thickness of 0.050 mm. is cast from a 10 percent solution of a polycarbonate of 2,2-di(4-hydroxyphenyl)-propane in methylene chloride. After drying, a second foil with a thickness of 0.010 mm. is cast thereon from a 10 percent solution in methylene chloride of an isocyanate-modified polyhydroxy compound of adipic acid, ethylene glycol, diethylene glycol, trimethylol propane, and hexamethylene diisocyanate, produced according to Example 1 of German Patent No. 1,012,456. After it has dried, a third layer with a thickness of 0.020 mm. is cast thereon from a 10 percent solution in methylene chloride of a cellulose acetobutyrate with 43.0 percent acetic acid and 17.0 percent butyric acid.

The coated polycarbonate foil is transparent. The cellulose ester layer is not detached from the polycarbonate foil, even under strong mechanical stressing.

*Example 2*

A polycarbonate foil is produced by casting a 10 percent solution of a polycarbonate consisting of 95 percent of 2,2-di(4-hydroxyphenyl)-propane and 5 percent of 1,1-di(4-hydroxyphenyl)-cyclohexane in methylene chloride.

This foil has cast thereon a second layer from a 10 percent solution of the isocyanate-modified polyhydroxy compound according to Example 1 and an addition of 10 percent of triphenylmethane-4,4',4''-triisocyanate, related to the isocyanate-modified polyhydroxy compound. The casting of the third layer is effected with a 13.5 percent solution of cellulose triacetate and triphenyl phosphate (10 parts of triphenyl phosphate to 100 parts of cellulose triacetate) in methylene chloride with 2 percent of isopropanol, related to the total quantity of solvent.

*Example 3*

First of all, a foil with a thickness of 0.050 mm. is cast with a 10 percent solution of a polycarbonate of 2,2-di(4-hydroxyphenyl)-n-pentane in methylene chloride. A second layer with a thickness of 0.025 mm. is applied to this foil by casting with a 10 percent solution in methylene chloride of a mixture of 3 parts of an isocyanate-modified polyhydroxy compound according to Example 1 and 7 parts of a cellulose acetobutyrate with 24 percent acetic acid and 42 percent butyric acid.

*Example 4*

A foil with a thickness of 0.040 mm. is cast from a 10 percent solution of a polycarbonate of 2,2-di(4-hydroxyphenyl)-propane in methylene chloride. A second layer is applied to the dried foil by casting with a 10 percent solution of an isocyanate-modified polyhydroxy compound according to Example 1 in methylene chloride, the second layer having a thickness of 0.01 mm. Finally, a third layer is cast with a 10 percent solution of a cellulose nitrate with a nitrogen content of 12.0 percent N and a K-value of 950 in acetone.

*Example 5*

A foil with a thickness of 0.12 mm. is cast from 15 percent solution of 4,4'-dihydroxydiphenyl methane polycarbonate in methylene chloride. A second layer is applied to the dried foil with a thickness of 0.001–0.005 mm. of a polyhydroxy compound of diglycol polyester of adipic acid, trimethylol propane and hexamethylene diisocyanate which is prepared as described in Example 5 of German Patent No. 1,012,456. Onto this anchoring layer is cast a third layer of cellulose triacetate with a thickness of 0.02 mm.

This multilayer foil is suitable as a support for photographic films.

What is claimed is:

1. A process for coating foils of linear polycarbonates of high molecular weight with inorganic or organic cellulose esters, wherein a foil of high molecular weight linear polycarbonates of aromatic dihydroxy compounds is provided with a layer consisting of cellulose esters in the presence of isocyanate-modified polyhydroxy compounds as anchoring agents, the said polyhydroxy compounds being of high molecular weight and soluble in organic solvents.

2. A process as claimed in claim 1, wherein the anchoring agent consisting of high-molecular, isocyanate-modified polyhydroxy compounds which are soluble in organic solvents is added to a cellulose ester solution, and the latter is then used for the coating.

3. A process as claimed in claim 1, wherein the anchoring agent consisting of high-molecular, isocyanate-modified, polyhydroxy compounds which are soluble in organic solvents is used as an intermediate layer.

4. A process according to claim 3, wherein the intermediate layer consisting of 100 parts by weight of high-molecular, isocyanate-modified, polyhydroxy compounds soluble in organic solvents has added thereto 5–25 parts by weight of polyisocyanates selected from the class consisting of hexamethylene diisocyanate, 1-methyl-benzene-2,6-diisocyanate, 1-methyl-benzene-2,2-diisocyanate, naphthalene-1,5-diisocyanate, triphenylmethane-4,4',4''-triisocyanate, and diphenylmethane-4,4'-diisocyanate.

5. A multilayer foil which comprises a foil of a high molecular weight linear polycarbonate of aromatic dihydroxy compounds, an intermediate layer of an isocyanate-modified polyhydroxy compound of high molecular weight and a front layer of a cellulose ester selected from the class consisting of cellulose acetate, cellulose butyrate, cellulose aceto butyrate and cellulose nitrate.

6. A multilayer foil which comprises a foil of a high molecular weight linear polycarbonate of aromatic dihydroxy compounds, an intermediate layer of an isocyanate-modified polyhydroxy compound of high molecular weight with an additional content of 5–25 parts by weight of a polyisocyanate selected from the class consisting of hexamethylene diisocyanate, 1-methyl-benzene-2,6-diisocyanate, 1-methyl-benzene-2,3-diisocyanate, naphthalene-1,5-diisocyanate, triphenylmethane-4,4',4''-triisocyanate or diphenyl-methane-4,4'-diisocyanate based on 100 parts by weight of the isocyanate-modified polyhydroxy compound, and an outer layer of a cellulose ester selected from the class consisting of cellulose acetate, cellulose butyrate, cellulose aceto butyrate and cellulose nitrate.

7. A multilayer foil which comprises a foil of a high molecular weight linear polycarbonate of an aromatic dihydroxy compound, a second layer consisting of 10–120 parts by weight of an isocyanate-modified polyhydroxy compound, and 100 parts by weight of a cellulose ester selected from the class consisting of cellulose acetate, cellulose butyrate, cellulose aceto butyrate and cellulose nitrate.

8. A process for coating a foil of a synthetic organic linear polycarbonate of a bis(hydroxyphenyl) alkane of high molecular weight with a foil of a cellulose ester which comprises applying to a foil of said polycarbonate a layer of said cellulose ester in the presence of an isocyanate-modified polyhydroxy compound of high molecular weight which is soluble in organic solvents and functions as an anchoring agent, said isocyanate-modified polyhydroxy compound being selected from the group consisting of reaction products of (I) organic diisocyanates with polyhydroxy compounds selected from the class consisting of (1) condensation products of hydroxycarboxylic acids, (2) condensation product of hydroxy-carboxylic acids in admixture with polyalcohols, (3) condensation products of diglycols and dicarboxylic acids, (4) condensation products of diglycols and dicarboxylic acids in admixture with polyalcohols, (5) condensation products of alkylene oxides, (6) condensation products of polyalkylene oxides in admixture with polyalcohols, and (7) mixtures thereof, and (II) mixtures of diisocyanates and polyisocyanates with polyhydroxy compounds selected from the class consisting of (*a*) condensation products of hydroxycarboxylic acids, (*b*) condensation products of diglycols and dicarboxylic acids, and (*c*) polyalkylene oxides, and (*d*) mixtures thereof.

9. The process of claim 8 which comprises incorporating said isocyanate-modified polyhydroxy compound into said cellulose ester layer by adding said isocyanate-modified polyhydroxy compound to a casting solution of said cellulose ester before applying said solution to the polycarbonate foil.

10. The process of claim 8 wherein the anchoring agent consisting of a high molecular, isocyanate-modified polyhydroxy compound which is soluble in organic solvents is used as an intermediate layer between the polycarbonate foil and the cellulose ester layer.

11. The process of claim 10 wherein said intermediate layer consisting of 100 parts by weight of a high molecular, isocyanate-modified polyhydroxy compound soluble in organic solvents has added thereto 5–25 parts by weight of a polyisocyanate selected from the class consisting of hexamethylene diisocyanate, 1-methyl-benzene-2,6-diisocyanate, 1-methyl-benzene-2,2-diisocyanate, naphthalene-1,5-diisocyanate, triphenylmethane-4,4',4''-triisocyanate, and diphenyl-methane-4,4'-diisocyanate.

References Cited in the file of this patent

UNITED STATES PATENTS

| 2,707,157 | Stanton et al. | Apr. 26, 1955 |
| 2,776,223 | Brown et al. | Jan. 1, 1957 |
| 2,874,046 | Klockgether et al. | Feb. 17, 1959 |
| 2,945,008 | Caldwell et al. | July 12, 1960 |